United States Patent
Meyer et al.

(10) Patent No.: US 8,134,491 B1
(45) Date of Patent: Mar. 13, 2012

(54) SYSTEMS AND METHODS FOR TERRAIN AND OBSTACLE DETECTION BY WEATHER RADAR

(75) Inventors: Nathanael A. Meyer, Coralville, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 132 days.

(21) Appl. No.: 12/553,867

(22) Filed: Sep. 3, 2009

(51) Int. Cl.
*G01S 13/00* (2006.01)

(52) U.S. Cl. ............... 342/65; 342/73; 342/74; 342/75

(58) Field of Classification Search ............ 342/65
See application file for complete search history.

(56) References Cited

U.S. PATENT DOCUMENTS

| | | | |
|---|---|---|---|
| 4,940,987 A * | 7/1990 | Frederick | 342/26 D |
| 5,825,039 A * | 10/1998 | Hartley | 250/492.22 |
| 5,828,332 A * | 10/1998 | Frederick | 342/26 B |
| 6,388,607 B1 | 5/2002 | Woodell | |
| 6,388,608 B1 | 5/2002 | Woodell et al. | |
| 6,424,288 B1 | 7/2002 | Woodell | |
| 6,603,425 B1 | 8/2003 | Woodell | |
| 6,741,203 B1 | 5/2004 | Woodell | |
| 6,879,280 B1 | 4/2005 | Bull et al. | |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,242,343 B1 * | 7/2007 | Woodell | 342/26 B |
| 7,292,178 B1 | 11/2007 | Woodell et al. | |
| 7,307,583 B1 | 12/2007 | Woodell et al. | |
| 7,372,394 B1 | 5/2008 | Woodell et al. | |
| 7,379,014 B1 | 5/2008 | Woodell et al. | |
| 7,417,578 B1 | 8/2008 | Woodell et al. | |
| 7,417,579 B1 | 8/2008 | Woodell | |
| 7,486,219 B1 | 2/2009 | Woodell et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,765 B1 | 5/2009 | Woodell et al. | |
| 7,541,970 B1 | 6/2009 | Godfrey et al. | |
| 7,541,971 B1 | 6/2009 | Woodell et al. | |
| 7,576,680 B1 | 8/2009 | Woodell | |
| 7,598,902 B1 | 10/2009 | Woodell et al. | |
| 7,609,200 B1 | 10/2009 | Woodell et al. | |
| 7,633,430 B1 | 12/2009 | Wichgers et al. | |
| 7,633,431 B1 | 12/2009 | Wey et al. | |
| 2007/0247350 A1 * | 10/2007 | Ryan | 342/65 |

* cited by examiner

*Primary Examiner* — Timothy A Brainard (74) *Attorney, Agent, or Firm* — Daniel M. Barbieri (57) ABSTRACT

A method is provided for controlling an aircraft-mounted radar system configured to project radar beams and to receive radar returns relating to the projected radar beams. The method includes providing at least one output to the radar system that causes the radar system to sweep the radar beam horizontally to create a horizontal sweep set. The method further includes providing at least one output to the radar system that causes the radar system to conduct two vertical sweeps during the horizontal sweep set, the two vertical sweeps offset from a center horizontal location by at least one beam width, and wherein each of the two vertical sweeps are on opposite sides of the center horizontal location.

26 Claims, 9 Drawing Sheets

SYSTEMS AND METHODS FOR TERRAIN AND OBSTACLE DETECTION BY WEATHER RADAR

BACKGROUND

The present disclosure relates generally to the field of airborne radar systems. The present disclosure more specifically relates to the field of terrain and obstacle detection using airborne radar systems such as weather radar systems.

Conventional weather radar systems conduct one or two horizontal radar sweeps during a given sweep "set" to detect weather and terrain or other ground obstacles. The horizontal radar scans are usually horizontally symmetrical on-center of the aircraft and are typically conducted at a single tilt (i.e., vertical) angle. In some systems, a first horizontal scan will be conducted at a first tilt angle and a second horizontal scan will be conducted at a second tilt angle. The applicants have discovered that such conventional systems are limited in their vertical resolution.

SUMMARY

One embodiment of the present disclosure relates to a method for controlling an aircraft-mounted radar system configured to project radar beams and to receive radar returns relating to the projected radar beams. The method includes providing at least one output to the radar system that causes the radar system to sweep the radar beam horizontally (e.g., in a first direction and a second direction, horizontal sweeps created by 360 degree rotation of an antenna in one direction, etc.) to create a horizontal sweep set. The method further includes providing at least one output to the radar system that causes the radar system to conduct two vertical sweeps during the horizontal sweep set, the two vertical sweeps offset from a center horizontal location by at least one beam width, and wherein each of the two vertical sweeps are on opposite sides of the center horizontal location.

Another embodiment of the present disclosure relates to an apparatus for controlling an aircraft-mounted radar system configured to project radar beams and to receive radar returns relating to the projected radar beams. The apparatus includes at least one output to the radar system and processing electronics configured to provide signals to the output or outputs to cause the radar system to sweep a radar beam horizontally and away from a center location. The processing electronics are further configured to cause the radar system to sweep the radar beam vertically when the radar beam is horizontally offset from the center horizontal location by more than one beam width. The processing electronics are configured to cause the radar beam to continue the horizontal sweep upon completion of the vertical sweep.

Yet another embodiment of the present disclosure relates to a radar system for mounting to an aircraft and configured to project radar beams and to receive radar returns relating to the projected radar beams. The radar system includes a controller configured to cause the radar system to sweep the radar beam horizontally to create a horizontal sweep set and to conduct two vertical sweeps during the horizontal sweep set, the two vertical sweeps offset from a center horizontal location by at least one beam width, and wherein each of the two vertical sweeps are on opposite sides of the center horizontal location.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Referring generally to the figures, systems and methods for conducting terrain and obstacle detection with an aircraft-mounted weather radar system is described. A weather radar system (e.g., a weather radar system) is generally configured to project radar beams and to receive radar returns relating to the projected radar beams. Using the return data, processing electronics associated with the weather radar system can distinguish between weather (e.g., rain) and terrain (e.g., a mountain, a building). To provide adequate radar coverage for detecting weather, the weather radar system is configured to sweep the radar beam horizontally in a first direction (e.g., left) and a second direction (e.g., right) to create a horizontal sweep set. Without dramatically increasing the time for completing the horizontal sweep set, the weather radar system is configured to conduct two vertical sweeps during the horizontal sweep set. The vertical sweeps are offset from a center horizontal location by at least one beam width and each of the two vertical sweeps are on opposite sides of the center horizontal location. The systems and methods described herein may provide for improved vertical resolution, improved vertical resolution to the left and right of the aircraft's ground track, and provide for improved accuracy when distinguishing between weather and terrain.

Figure 1:
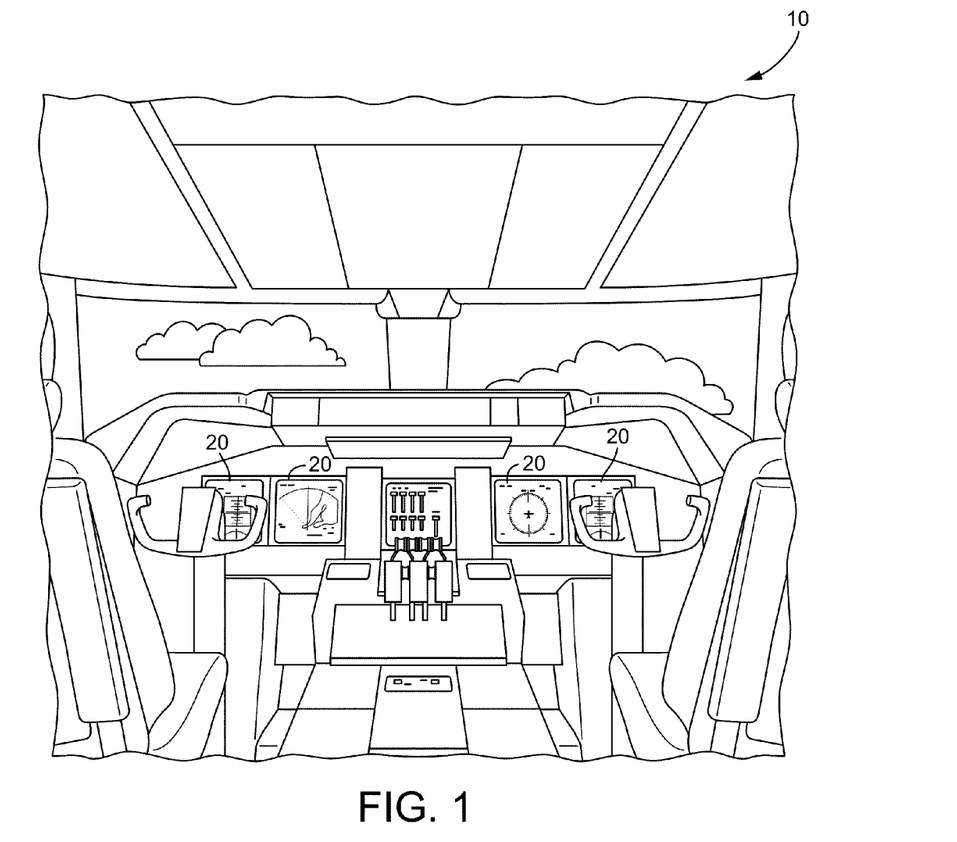
FIG. 1 is an illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, or any other view of weather and/or terrain detected by a radar system on the aircraft. The views of weather and/or terrain may include monochrome or color graphical representations of the weather and/or the terrain. Graphical representations of weather or terrain may include an indication of altitude of those objects or the altitude relative to the aircraft. Aircraft control center 10 may further include terrain awareness and warning system (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

Figure 2:
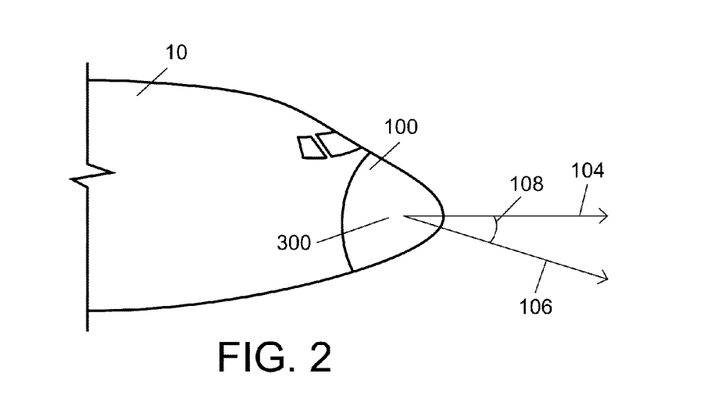
FIG. 2 is an illustration view of the nose of an aircraft including a weather radar system, according to an exemplary embodiment.

In FIG. 2, the front of an aircraft is shown with aircraft control center 10 and nose 100, according to an exemplary embodiment. A radar system 300 (e.g., a weather radar system or other radar system) is generally located within nose 100 of the aircraft or within aircraft control center 10 of the aircraft. According to various exemplary embodiments, radar system 300 may be located on the top of the aircraft or on the tail of the aircraft instead. Radar system 300 may include or be coupled to an antenna system. A variety of different antennas or radar systems may be used with the present invention (e.g., a split aperture antenna, a monopulse antenna, a sequential lobbing antenna, etc.).

Referring further to FIG. 2, radar system 300 generally works by sweeping a radar beam horizontally back and forth across the sky. Some radar systems will conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display shown, for example, in FIG. 1. Returns can also be processed to, for example, distinguish between terrain and weather, to determine the height of terrain, or to determine the height of weather. Radar system 300 may be a WXR-2100 MultiScan™ radar system or similar system manufactured by Rockwell Collins. According to other embodiments, radar system 300 may be an RDR-4000 system or similar system manufactured by Honeywell International, Inc.

Figure 3A:
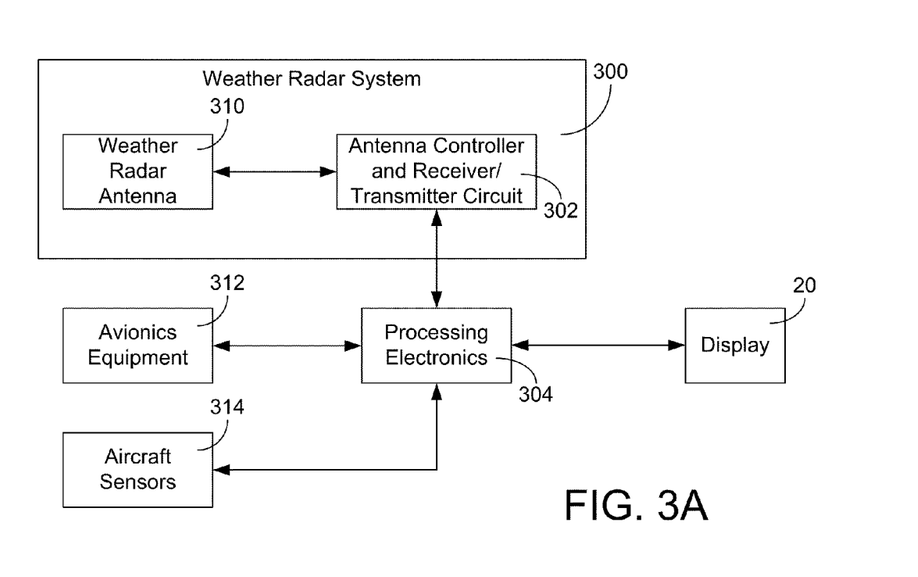
FIG. 3A is a block diagram of a weather radar system, according to an exemplary embodiment.

Referring to FIG. 3A, a block diagram of a weather radar system 300 is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 304 to change behavior or radar beam patterns. In other words, processing electronics 304 may include the processing logic for operating weather radar system 300.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to the processing electronics 304. Processing electronics are further shown as connected to avionics equipment 312. Avionics equipment 312 may be or include a flight management system, a navigation system, a backup navigation system, or another aircraft system configured to provide inputs to processing electronics 304.

Figure 3B:
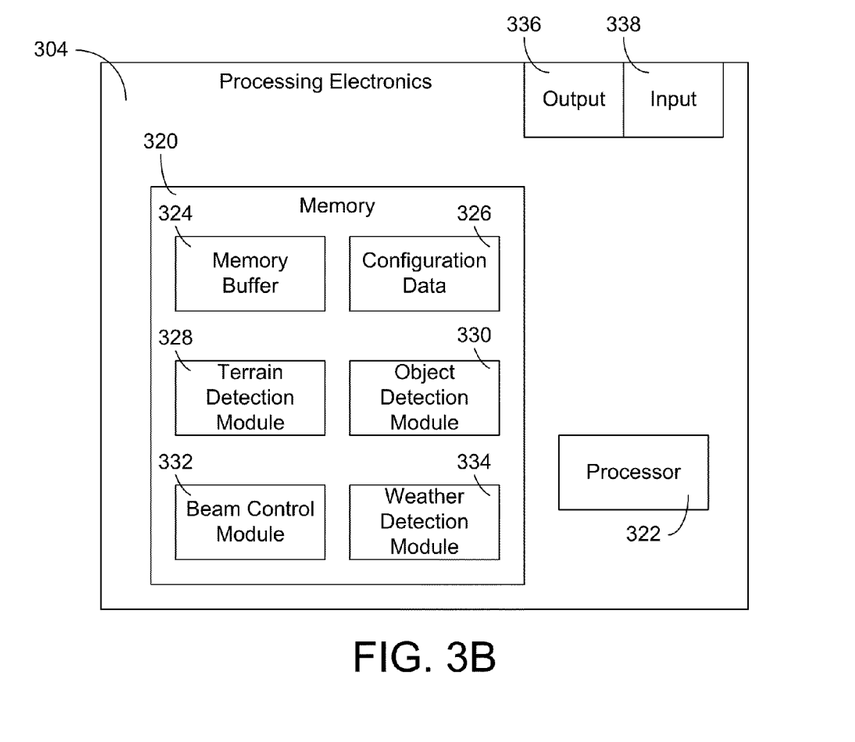
FIG. 3B is a block diagram of the processing circuit of the weather radar system of FIG. 3A, according to an exemplary embodiment.

Referring to FIG. 3B, a detailed block diagram of processing electronics 304 of FIG. 3A is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 328-334 which are computer code modules (e.g., executable code, object code, source code, script code, machine code, etc.) configured for execution by processor 322. When executed by processor 322, processor 304 is configured to complete the activities described herein. Processing electronics includes hardware circuitry for supporting the execution of the computer code of modules 328-334. For example, processing electronics 304 includes hardware interfaces (e.g., output 336) for communicating control signals (e.g., analog, digital) from processing electronics 304 to circuit 302. Processing electronics 304 may also include an input 338 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a forward looking terrain alerting algorithm, a terrain detection module 328, an object detection module 330, a weather detection module 334, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

Memory 320 further includes configuration data 326. Configuration data 326 includes data relating to weather radar system 300. For example, configuration data 326 may include beam pattern data which may be data that beam control module 332 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like.

Memory 320 further includes a terrain detection module 328 which includes logic for using radar returns in memory buffer 324 to detect the presence or absence of terrain. Terrain detection module 328 may be a part of TAWS system or be utilized by a TAWS system (e.g., terrain determinations are provided from module 328 to a TAWS device or module). Terrain detection module 328 may include or be coupled to a terrain database or other memory including terrain data. Terrain detection module 328 may be configured to use radar return information or information derived by radar return information with terrain data stored in a terrain database or other memory.

Memory 320 further includes an object detection module 330 which includes logic for using radar returns in memory buffer 324 to detect the presence or absence of objects or other ground clutter. Object detection module 330 may be configured to check radar return data against a terrain database to determine the accuracy of the radar return information or to determine whether to suppress or promote alerts or other information (e.g., display information) relating to an object detection.

Memory 320 is further shown to include weather detection module 334 which includes logic for using radar returns in memory buffer 324 to conduct one or more determinations relating to weather. For example, weather detection module 334 may be configured to determine a gain level or other display setting for display of the radar returns on a weather radar display. Weather detection module 334 may further be configured to distinguish terrain returns from weather returns. Weather detection module 334 may be configured to determine when weather is hazardous, determine characteristics of weather (e.g., growth rate), or to conduct any other processing steps (e.g., filtering) relative to radar return data used for weather display or warning in the aircraft.

Memory 320 is further shown to include beam control module 332. Beam control module 332 may be an algorithm for commanding circuit 302 to sweep a radar beam. Beam control module 332 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 332 may be configured to control timing of the beam sweeps or movements relative to aircraft speed, flight path information, transmission or reception characteristics from weather radar system 300 or otherwise. Beam control module 332 may receive data from configuration data 326 for configuring the movement of the radar beam.

Referring generally to FIGS. 4A-D, a number of exemplary radar beam patterns are illustrated. The radar beam patterns may be created by the weather radar system based on control activities provided by circuit 302 shown in FIG. 3A and processing electronics 304 shown in FIGS. 3A and 3B. For example, beam control module 332 may provide control signals to circuit 302 that command weather radar system 300 to provide certain radar beam movements that form the patterns illustrated in FIGS. 4A-D. The radar beam patterns shown in FIGS. 4A-D are graphical representations of how a radar beam projected forward into the page would be moved according to various embodiments. For example, when a line of FIGS. 4A-D runs to the right side of the page, the line represents a horizontal radar movement (i.e., "sweep" or "scan") to the right; when the line runs downward relative to the page, the line represents a vertical downward scan by the radar beam. In some embodiments the nose of the aircraft would be pointing directly into and perpendicular to the page surface. Further, in FIGS. 4A-D, a center horizontal location is marked. In embodiments where the nose of the aircraft points directly into and perpendicular to the page surface, the center horizontal location may be coextensive with the ground track of the aircraft when the aircraft is flying level. According to other exemplary embodiments (and/or dependent on aircraft movement), the center horizontal location may be a symmetrical center of a far left of a horizontal sweep set and a far right of the horizontal sweep set.

Figure 4A:
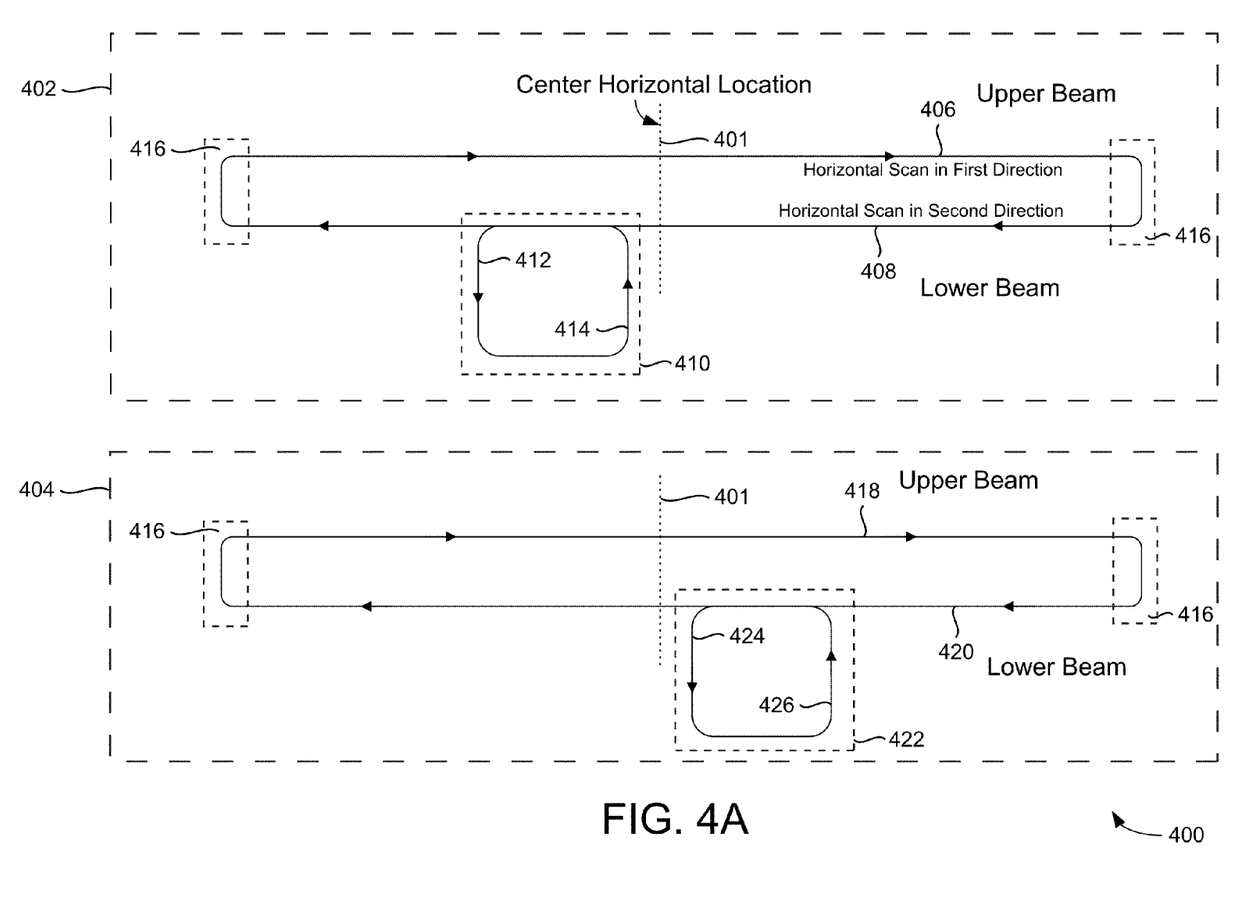
FIGS. 4A-D are illustrations of radar beam sweep sets generated by the systems and methods described herein, according to an exemplary embodiment.

Referring particularly to FIG. 4A, a horizontal sweep set 400 is shown. Horizontal sweep set 400 includes a first horizontal sweep 402 and a second horizontal sweep 404. Second horizontal sweep 404 is conducted before or after first horizontal sweep 402 has completed. First horizontal sweep 402 comprises a horizontal scan in a first direction 406 and a horizontal scan in a second direction 408. As shown in FIG. 4A, the horizontal scan in the first direction 406 may be an upper beam and the horizontal scan in the second direction may be a lower beam (e.g., a beam at a downward tilt angle). According to other exemplary embodiments, the horizontal scans are conducted at the same tilt angle.

In the embodiment shown in FIG. 4A, during horizontal sweep set 400, two vertical sweeps 410 and 422 are caused to be conducted. Vertical sweeps 410 and 422 are offset from a center horizontal location 401. According to an exemplary embodiment, vertical sweeps 410 and 422 are offset from center horizontal location 401 by at least one beam width. Beam width may be defined as the range of angles for which the beam gain remains larger than three decibels down (−3 dB) from the peak value. Further, each of the two vertical sweeps 410 and 422 are on opposite sides of the center horizontal location. In the embodiment shown in FIG. 4A, for example, vertical sweep 410 is to the left of center horizontal location 401 while vertical sweep 422 is to the right of center horizontal location 401.

According to the exemplary embodiment shown in FIG. 4A, both vertical sweeps 410, 422 extend below lower beams 408, 420 or the lower tilt angles for horizontal sweeps 402, 404. As mentioned above relative to FIGS. 3A and 3B, radar returns received at the radar system in response to the beams projected from the radar system can be provided as radar return data to a memory buffer and processing electronics may be configured to process the radar return data. The processing can include, for example, estimating a presence of terrain using the radar return data, confirming the presence of terrain, determining whether to generate a terrain alert, and forming an image using the radar return data in memory, the image displayed on an electronic display system viewable by a pilot of the aircraft. The radar system may be a weather radar system where the processing electronics are further configured to distinguish radar returns relating to weather from radar returns relating to terrain using returns from vertical sweeps 410, 422. Due to the spacing of vertical sweeps 410, 422 and the fact that vertical sweeps 410 and 422 extend below the lower horizontal beam, the embodiments shown in FIGS. 4A-D provide increased resolution and accuracy of weather and/or terrain at angles offset from center. This increased resolution and accuracy can improve pilot awareness or TAWS capabilities when, for example, a turn of the aircraft is anticipated or initiated. For example, by scanning down and to the left of the aircraft in a way that would not previously have been conducted during conventional horizontal scanning, a TAWS system may be able to alert the pilot of a mountain or another high altitude terrain feature that would make a turn down or to the left dangerous. According to an exemplary embodiment, the processing electronics are configured to complete the set of horizontal sweeps 402, 404, including vertical sweeps 410, 422 within ten seconds. In other embodiments, sweep 402 is conducted within ten seconds and sweep 404 is conducted in the following ten seconds.

As shown in FIG. 4A, vertical sweeps 410, 422 are conducted by scanning downward (downward scans 412, 424) from a horizontal sweep or scan. For example, during horizontal sweep 402, and particularly the horizontal scan 408 in the second direction, the system is shown to initiate vertical sweep 410 by conducting a downward scan 412, backtracking opposite from the direction of horizontal scan 408, conducting an upward scan 414, and resuming horizontal scan 408. During horizontal sweep 404, and particularly the horizontal scan 420 in the second direction, the system is shown to initiate vertical sweep 422 by conducting a downward scan 424, backtracking opposite from the direction of horizontal scan 420, conducting an upward scan 426, and resuming horizontal scan 420. According to some embodiments, including that shown in FIG. 4A, the downward scan and the upward scan of each vertical sweep is separated by less than two beam widths. According to other exemplary embodiments, any azimuth angle (including zero degrees) may separate the downward scan and the upward scan.

While widely spaced vertical scans may provide for improved lateral or turning resolution, it may be desirable to gain or retain vertical resolution near center horizontal location 401. In such embodiments, the applicants have discovered that while one of the scans in the vertical sweep can be widely spaced or offset from the center horizontal location (e.g., seventeen degrees off center, greater than seventeen degrees off center, about two beam widths off center), another of the scans in a vertical sweep can be close to the center horizontal location (e.g., three degrees off center, four degrees off center, less than one beam width off center, ½ beam width off center). In some embodiments, the offset angles from center for different vertical scans will complement each other to provide for greater than twenty degrees of terrain detection coverage below the tilt angle of the lower horizontal beam of a multi-scan system. For example, if the beam width is eight degrees, inner vertical scans at four degrees and outer vertical scans at eight degrees may provide for greater than twenty degrees of effective lateral coverage below the lower horizontal beam. In a preferred embodiment downward vertical scan 412 may be offset from center horizontal location 401 by at least one beam width or in some cases at least two beam widths and upward vertical scan 414 may much closer to center horizontal location 401 (e.g., within ½ beam width, within one beam width, etc.). In yet other embodiments, one scan of each vertical sweep (e.g., the innermost scan relative to the center horizontal location) is conducted at an offset from the center horizontal location so that at the offset its beam width overlaps with one scan of another vertical sweep. In yet other embodiments, the vertical scans of a single vertical sweep may be coextensive or within ½ beam width of each other.

Referring further to FIG. 4A, horizontal sweep set 400 is shown to include two primary horizontal sweeps 402 and 404 that form loops due to the multi-scan nature of the sweeps. Accordingly, vertical tilt adjustments 416 are shown to exist between upper beams 406, 418 and lower beams 408, 420. Vertical tilt adjustments can define a left maximum azimuth angle and a right maximum azimuth angle between which horizontal sweeps 402 and 404 extend. As shown in FIG. 4A, the entirety of vertical scans 410, 422 are conducted between the maximum azimuth angles defined by tilt adjustments 416 and the ends of horizontal scans 406, 408, 418, and 420. As is further shown in FIG. 4A, vertical sweeps 410, 412 alternate from being on the left of center horizontal location 401 and the right of the center horizontal location 401.

It should further be noted that a processing activity conducted by the system (e.g., processing electronics 304 shown in FIG. 3A) may include adjusting the offset from the center horizontal location at which the two vertical sweeps are conducted. The offset may be adjusted based on one or more of aircraft speed, aircraft altitude, fore-warning time parameters for a terrain awareness system, situational awareness circuitry parameters, flight path plans from an aircraft avionics system, or any other parameter or event.

While FIG. 4A illustrates the vertical scans extending below the lower horizontal beam of a multi-scan system, the systems and methods described herein may also or alternatively be configured to provide vertical scans above an upper horizontal beam. The direction of the vertical scans may be user-configurable by inserting user interface commands to the system. For example, if a pilot is flying low or ascending, he or she may wish to be sure to view weather above the aircraft and may flip a switch or otherwise command the processing electronics to provide vertical sweeps upward and above any upper horizontal scan. In other exemplary embodiments, the processing electronics may be configured to determine the direction and orientation for the vertical scans using aircraft avionics information, weather information, terrain information, or other data. For example, the processing electronics may utilize flight plan information to determine whether to use the vertical scans to scan below a lower horizontal scan or above an upper horizontal scan.

Figure 4B:
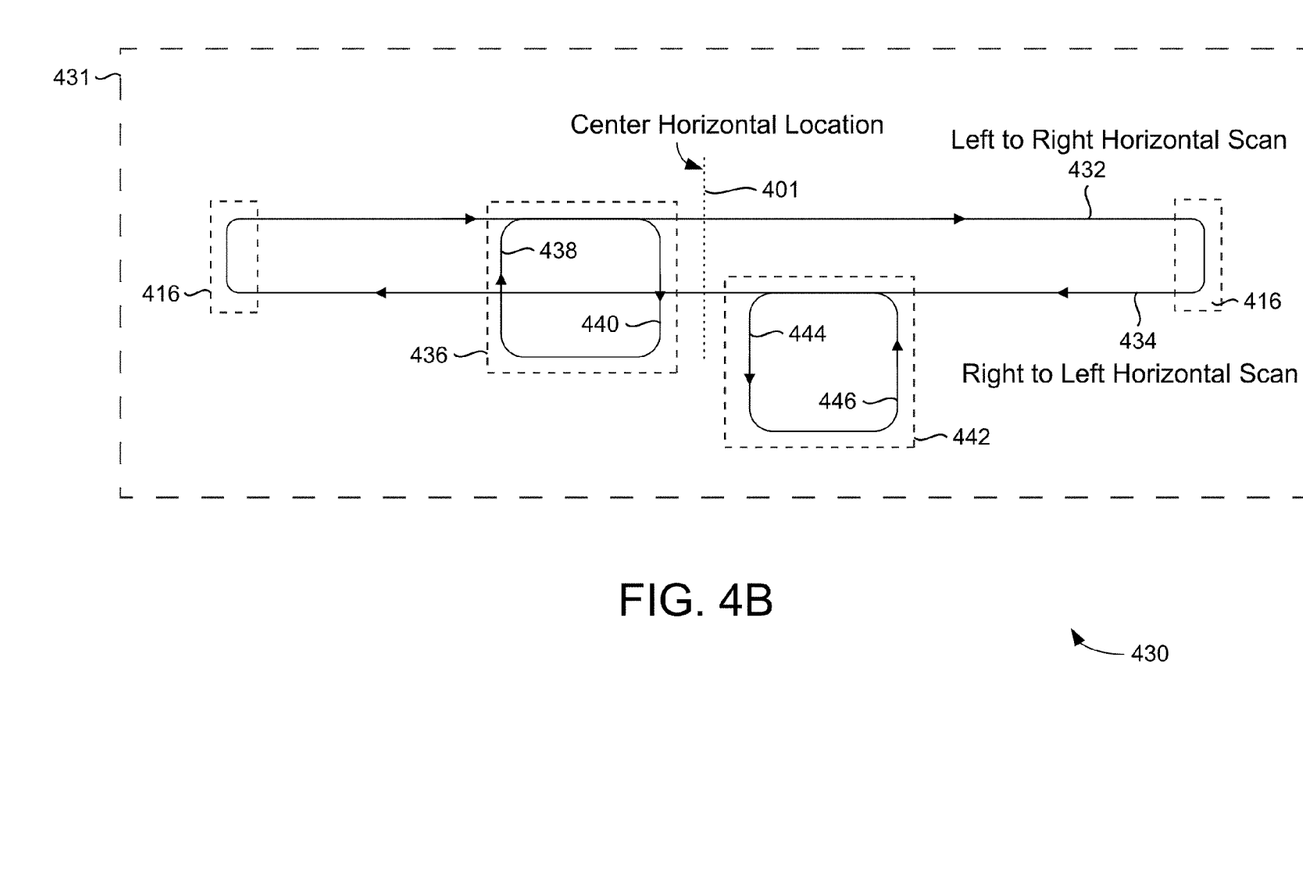

Referring now to FIG. 4B, an illustration of a radar beam horizontal sweep set 430 generated by the system described herein is shown, according to an exemplary embodiment. In this embodiment, the two vertical sweeps 436 and 442 are conducted during a single horizontal sweep 431. During the upper or left-to-right horizontal scan 432, vertical sweep 436 is conducted via downward scan 440 and upward scan 438. Similarly, during the lower or right-to-left horizontal scan 434, vertical sweep 442 is conducted via downward scan 444 and upward scan 446.

Figure 4C:
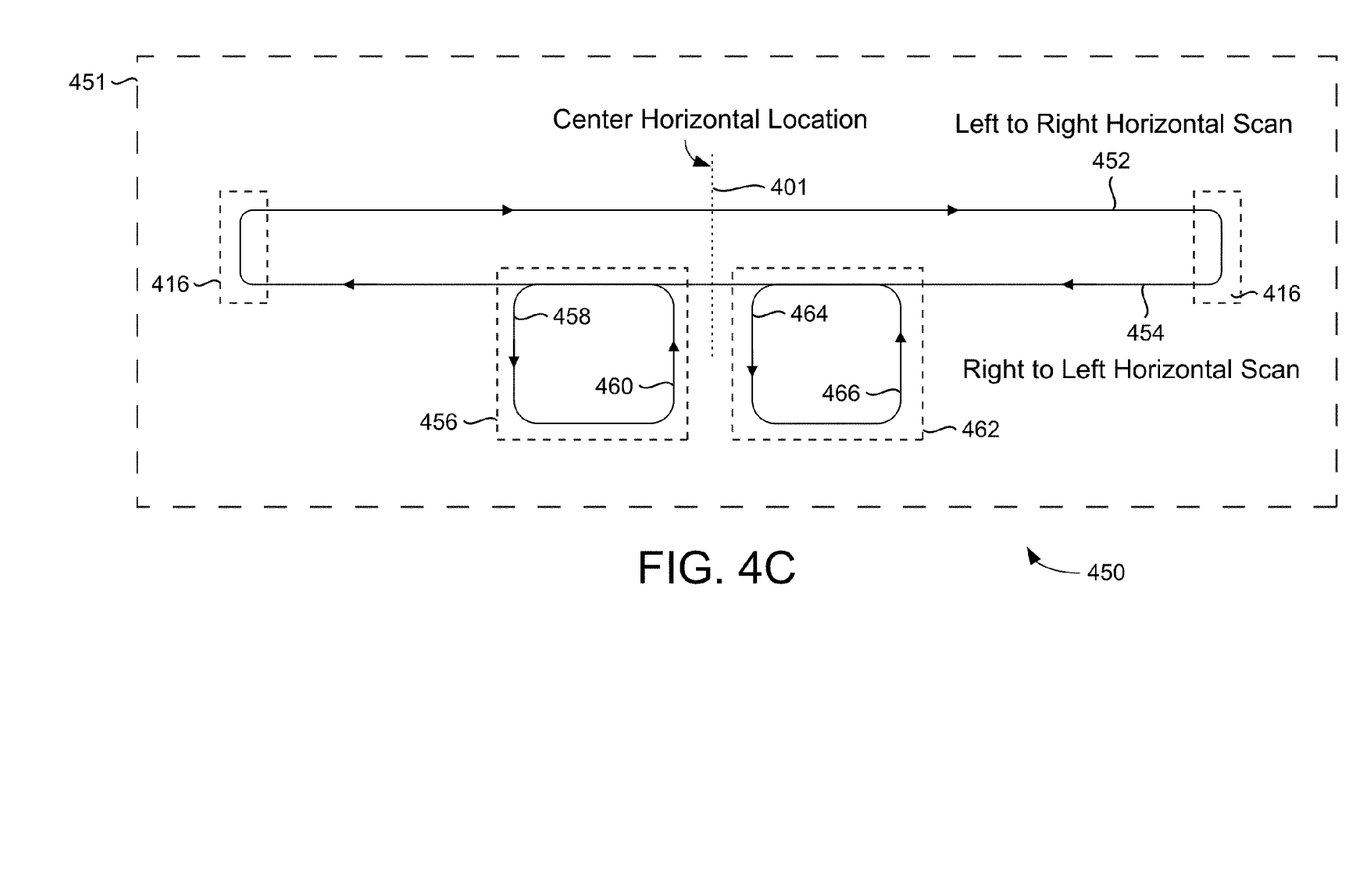

Referring now to FIG. 4C, an illustration of a radar beam horizontal sweep set 450 generated by the systems and methods described herein is shown, according to an exemplary embodiment. Like FIG. 4B, sweep set 450 includes vertical sweeps 456 and 462 conducted during a single horizontal sweep 451. During the lower or right-to-left horizontal scan 454, vertical sweep 462 is conducted via downward scan 464 and upward scan 466 and vertical sweep 456 is conducted via downward scan 458 and upward scan 460. Vertical sweep 462 is offset to the right of center horizontal location 401 and vertical sweep 456 is offset to the left of center horizontal location 401. In alternative embodiments to sweep set 450, both vertical sweeps 456, 462 may extend down from upper horizontal scan 452.

Figure 4D:
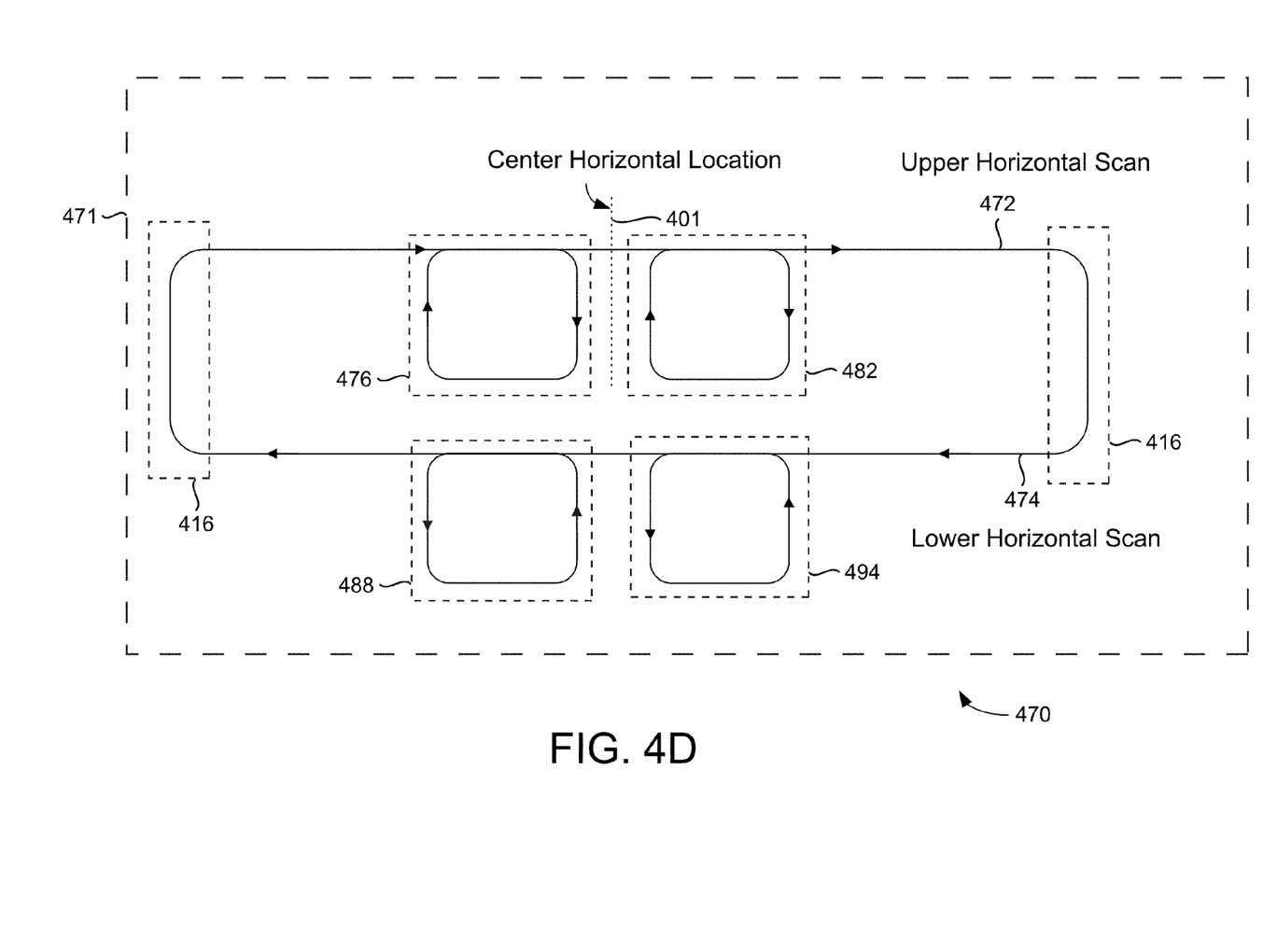

Referring now to FIG. 4D, an illustration of a radar beam horizontal sweep set 470 generated by the systems and methods described herein is shown, according to an exemplary embodiment. Sweep set 470 is shown to include a single horizontal sweep 471 from which four vertical sweeps 476, 482, 488, and 494 extend. In the embodiment shown in FIG. 4D, upper and lower horizontal scans 472 and 474 are separated by a larger tilt angle 416 and vertical sweeps 476 and 482 may be utilized to provide wide and narrow resolution between sweep 472 and 474. Vertical sweeps 488 and 494 may provide wide and narrow resolution extending below lower horizontal scan 474.

Figure 5:
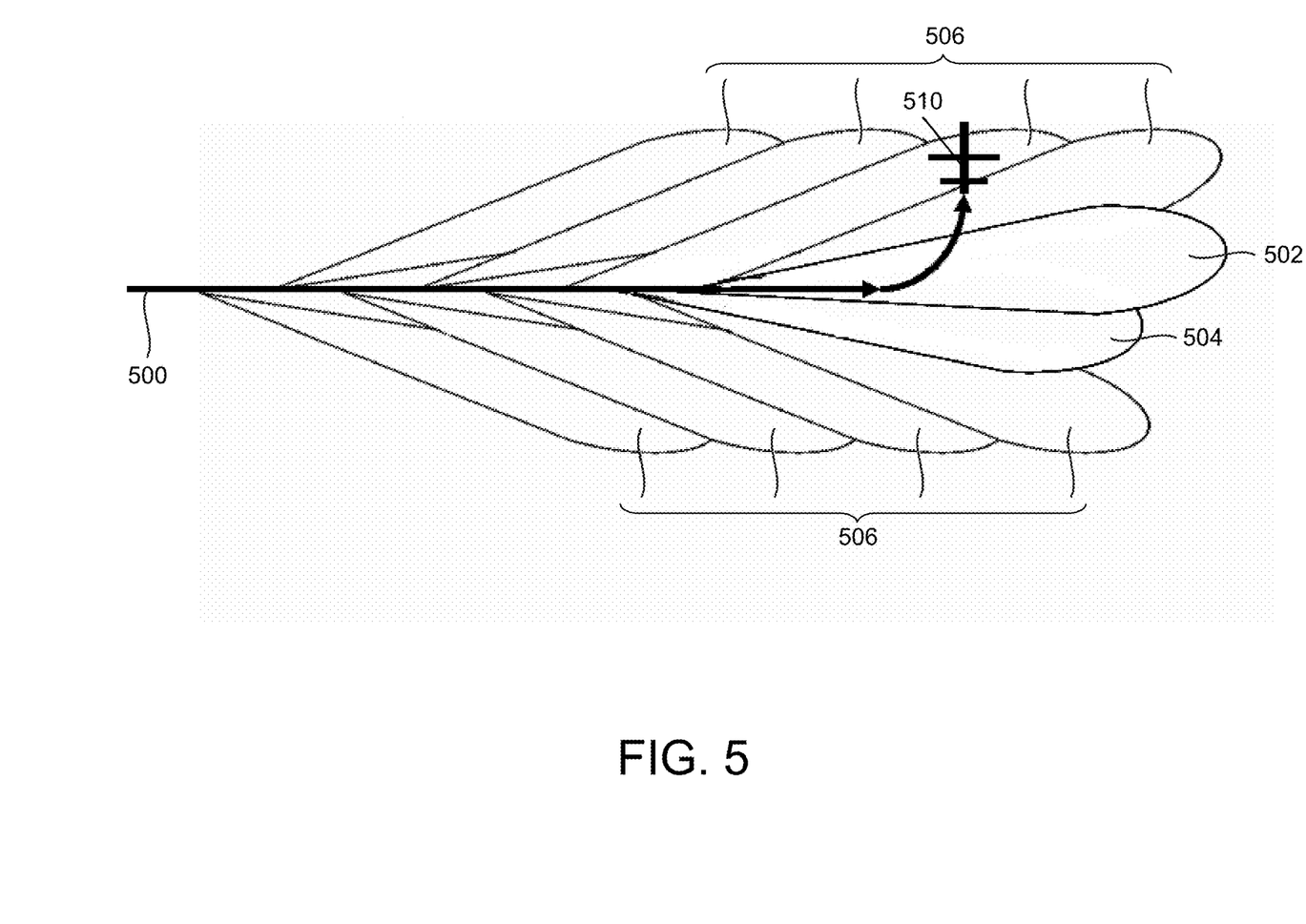
FIG. 5 is an top-down illustration of any of the sweep sets of FIGS. 4A-D, according to an exemplary embodiment.

Referring now to FIG. 5, an top-down illustration of any of the sweep sets shown in FIGS. 4A-D, repeated as aircraft 510 travels along flight path 500, is shown, according to an exemplary embodiment. As aircraft 510 travels, the weather radar system of aircraft 510 is providing wide horizontal beams 506 (e.g., as provided by the entirety of each horizontal sweep). Narrower radar beam loops 502, 504 may be created by the vertical sweeps shown in FIGS. 4A-D. When aircraft 510 begins its turn to the left, due to inner vertical sweeps 502, the pilot can have increased confidence over conventional systems that do not include inner vertical sweeps 502 but only conduct wide horizontal sweeps 506.

Figure 6:
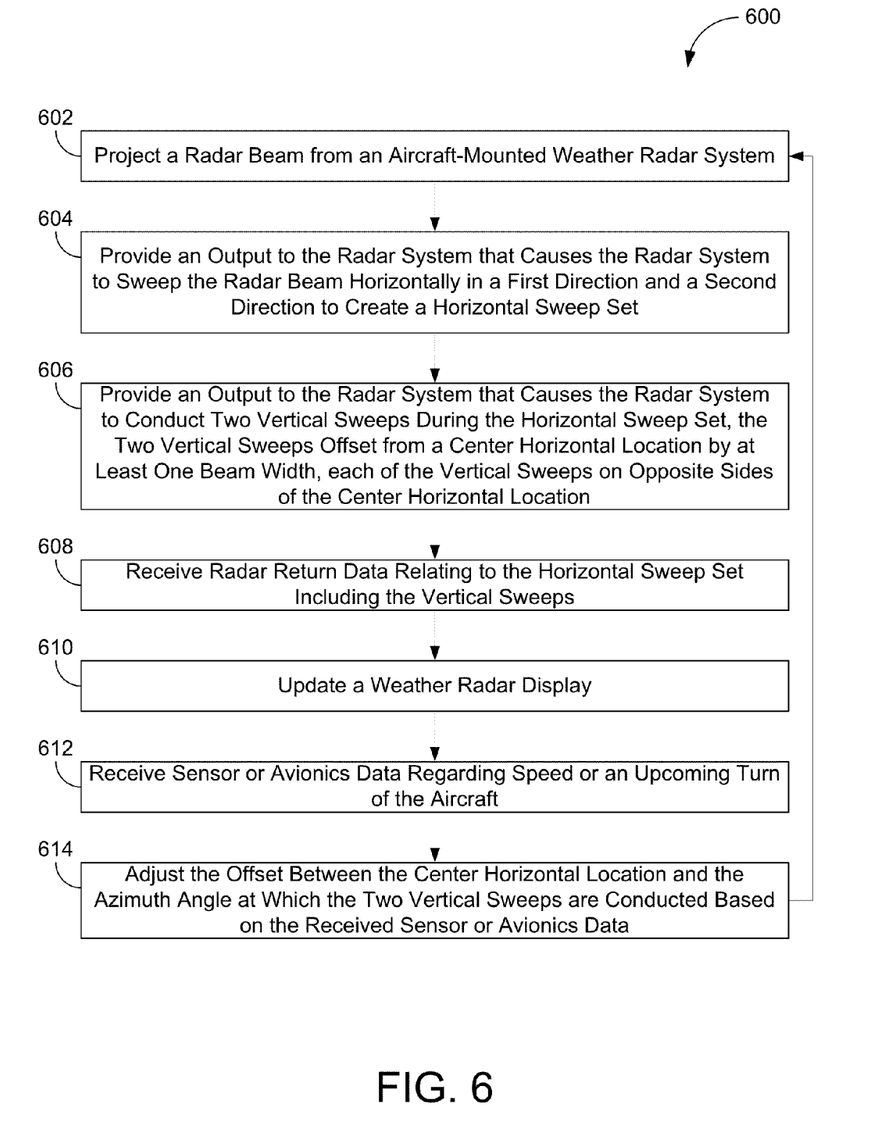
FIG. 6 is a flow chart of a process for providing the radar beam sweep sets disclosed herein, according to an exemplary embodiment.

Referring to FIG. 6, a flow chart of a process 600 for controlling an aircraft-mounted weather radar system configured to project radar beams and to receive radar returns relating to the projected radar beams is shown, according to an exemplary embodiment. Process 600 is shown to include the steps of projecting a radar beam from an aircraft-mounted weather radar system (step 602). While (or before) projecting the radar beam, processing electronics provide an output to the radar system that causes the radar system to sweep the radar beam horizontally in a first direction and a second direction to create a horizontal sweep set (step 604). An output is also provided to the radar system that causes the radar system to conduct two vertical sweeps during the horizontal sweep set (step 606), where the two vertical sweeps are offset from a center horizontal location by at least one beam width and each of the vertical sweeps extend from opposite sides of the center horizontal location. Process 600 is further shown to include receiving radar return data relating to the horizontal sweep set including the vertical sweeps (step 608). Processing electronics may then process the received radar return data (step 609) to interpret the horizontal sweep set including the vertical sweeps. According to an exemplary embodiment, the processing electronics may include one or more modules that specifically utilize returns associated with the vertical sweeps. For example, modules 328, 330, and 334 may separate the returns from the vertical sweeps and then use that information to make one or more decisions. Processing electronics may then update a weather radar display or another aircraft display using the radar return data and/or results of processing the return data (step 610). Process 600 is further shown to include receiving sensor or avionics data regarding speed or an upcoming turn of the aircraft (step 612). Based on the received sensor or avionics data, processing electronics of the system are configured to adjust the offset between the center horizontal location and the azimuth angle at which the two vertical sweeps are conducted (step 614).

It should be noted that while many of the exemplary embodiments are described with reference to weather radars systems, in other embodiments the radar system may be of any type or configured for any other purpose. For example, the horizontal and vertical sweeps could primarily be for terrain detection and not weather detection. In other embodiments, the horizontal sweep will be for a first purpose (e.g., the radar returns are evaluated using logic for determining weather or weather characteristics) while the vertical sweeps are for a second purpose (e.g., the radar returns are evaluated using logic for determining terrain or ground object characteristics). In yet other embodiments, one or more of the sweeps may be for plane detection, turbulence detection, wind sheer, wet weather, a second terrain mode, a second weather mode, or any other radar processing/display mode.

Figure 7:
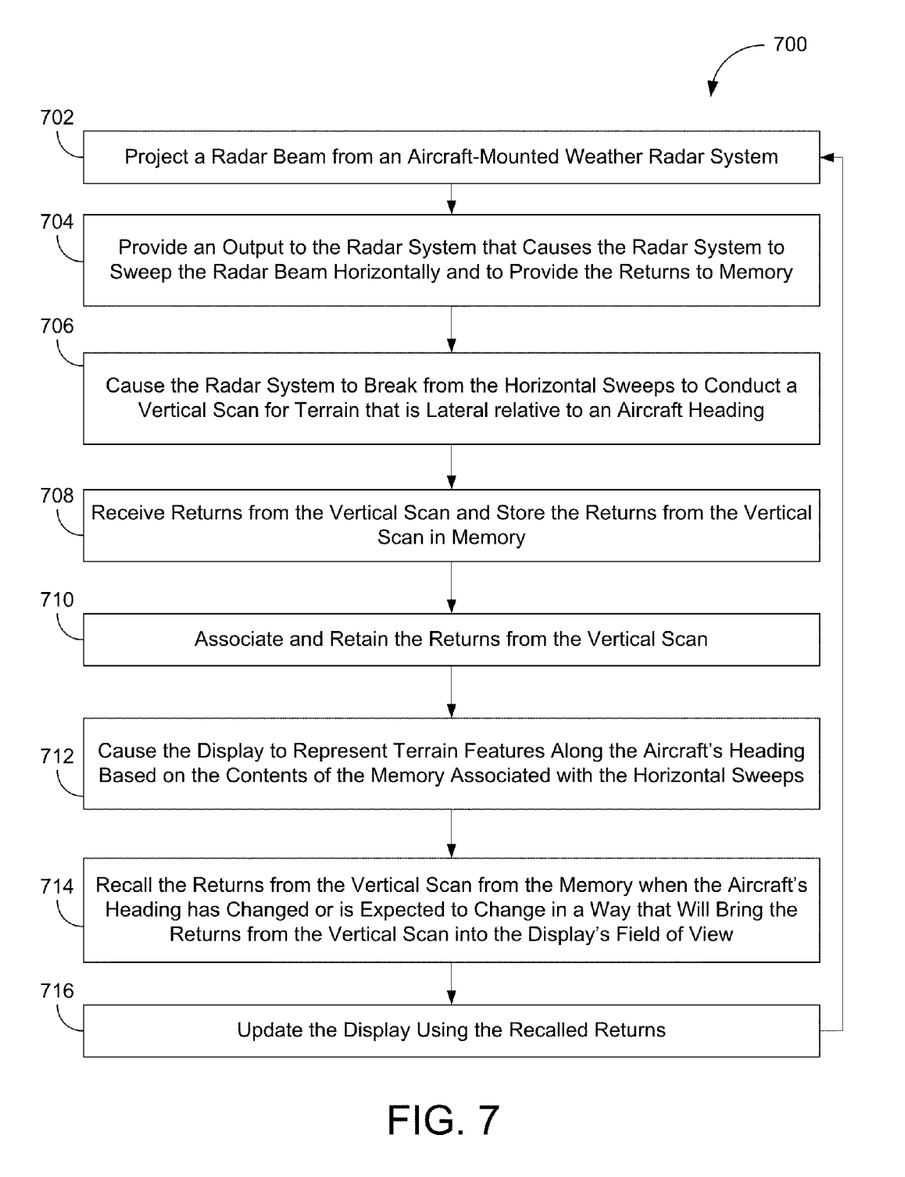
FIG. 7 is a flow chart of a process for using the vertical sweeps sets described herein to provide for greater display awareness when or before an aircraft turns, according to an exemplary embodiment.

Referring now to FIG. 7, a flow chart of a process 700 for providing navigation information to a display in an aircraft is shown, according to an exemplary embodiment. Process 700 may make use of the various scan techniques, aircraft-mounted radar systems, and methods described above. Accordingly, process 700 includes causing the radar system to sweep radar beams horizontally and to provide the resultant returns to memory (e.g., memory 320 or 324 shown in FIG. 3B, a multi-scan multi-tilt memory, etc.) (step 702). Process 700 further includes causing the radar system to break from the horizontal sweeps to conduct a vertical scan for terrain that is lateral relative to aircraft heading (step 704). The vertical sweeps or scans of step 704 may be any of the illustrated vertical sweeps or scan patterns shown in FIGS. 4A-5 or otherwise. Process 700 is further shown to include receiving returns from the vertical scan and storing the returns from the vertical scan in the memory (step 706). As (or after) returns from the vertical sweeps are received in memory they may be associated with returns from horizontal or vertical sweeps and retained in memory for later use (step 708). When the aircraft is heading relatively straight, processing electronics of the aircraft may cause the display to represent terrain features along the aircraft's heading based primarily on the contents of the memory associated with the horizontal sweeps (step 710). When the aircraft's heading has changed or is expected to change in a way that will bring the returns from the vertical scan into the display's field of view, process 700 includes recalling the returns from the vertical scan from the memory (step 712) and updating the display using the recalled returns (step 714). This way, and referring now to FIG. 5, as an aircraft changes heading, the pilot can immediately view (via the display) terrain features lateral to the aircraft's former heading that would not otherwise have been captured by the aircraft's radar. For example, in the instance where the aircraft is turning (as shown in FIG. 5), step 714 of updating the display may include using the recalled returns to rotate the display's field of view such that the returns from the vertical scan are rotated into the field of view of the updated display scene as the aircraft is turning.

Referring further to FIG. 7, updating the display using the recalled returns may not only include rotating what is shown on a display, but may also include translating the returns from the vertical scan in memory. For example, if the returns are stored in a coordinate map or array relative to aircraft position, then as the aircraft begins a turn, processing electronics of the system may translate, rotate, shift, or otherwise transform what is stored in memory for quick retrieval and/or display. Process 700 may make use of a variety of different memory schemes, including, for example, a geo-spatial storage scheme where returns (particularly the vertical returns) may be associated with earth-oriented positions such as GPS coordinates, latitude and longitude coordinates, or otherwise. In other embodiments the returns from the vertical scans (or other scans) may be retained in memory relative to aircraft position and may exist independently (at least directly) from an geo-spatial position.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling an aircraft-mounted radar system configured to project radar beams and to receive radar returns relating to the projected radar beams, the method comprising:
    causing the radar system to sweep a radar beam horizontally to create a horizontal sweep set, and
    causing the radar system to conduct two vertical sweeps during the horizontal sweep set, the two vertical sweeps being offset from a center horizontal location by at least one beam width, and wherein each of the two vertical sweeps are on opposite sides of the center horizontal location, wherein the horizontal sweep set includes two primarily horizontal loops, each of the two primarily horizontal loops comprising a horizontal sweep at a first tilt angle and a horizontal sweep at a second tilt angle, the two primarily horizontal loops extending between a left maximum azimuth angle and a right maximum azimuth angle;
    wherein one of the two vertical sweeps is conducted during a single primarily horizontal loop; and
    wherein the vertical sweeps are conducted between the left maximum azimuth angle and the right maximum azimuth angle.

2. A method of using an aircraft-mounted radar system configured to project radar beams and to receive radar returns relating to the projected radar beams, the method comprising:
    providing a radar beam horizontally to create a horizontal sweep set; and
    providing two vertical sweeps during the horizontal sweep set, the two vertical sweeps being offset from a center horizontal location by at least one beam width, and wherein each of the two vertical sweeps are on opposite sides of the center horizontal location, wherein each vertical sweep is conducted by scanning downward from a horizontal sweep of the horizontal sweep set and scanning upward to resume the horizontal sweep set.

3. The method of claim 2, wherein the horizontal sweep set includes two primarily horizontal loops, each of the two primarily horizontal loops comprising a horizontal sweep at a first tilt angle and a horizontal sweep at a second tilt angle, the two primarily horizontal loops extending between a left maximum azimuth angle and a right maximum azimuth angle;
    wherein one of the two vertical sweeps is conducted during a single primarily horizontal loop; and
    wherein the vertical sweeps are conducted between the left maximum azimuth angle and the right maximum azimuth angle.

4. The method of claim 3, wherein the vertical scans alternate from being on the left of the center horizontal location and the right of the center horizontal location during every other of the two loops.

5. The method of claim 4, wherein the vertical sweeps include downward scans below that of the lowest tilt angle for any horizontal sweep of the horizontal sweep set.

6. A method of using an aircraft-mounted radar system configured to project radar beams and to receive radar returns relating to the projected radar beams, the method comprising:
    providing a radar beam horizontally to create a horizontal sweep set; and
    providing two vertical sweeps during the horizontal sweep set, the two vertical sweeps being offset from a center horizontal location by at least one beam width, and wherein each of the two vertical sweeps are on opposite sides of the center horizontal location, and adjusting the offset between the center horizontal location and the azimuth angle at which the two vertical sweeps are conducted.

7. The method of claim 6, wherein the offset is adjusted by processing electronics based on at least one of aircraft speed, aircraft altitude, fore-warning time parameters for a terrain awareness system, situational awareness circuitry parameters, and flight path plans from an aircraft avionics system.

8. A method of using an aircraft-mounted radar system configured to project radar beams and to receive radar returns relating to the projected radar beams, the method comprising:
    providing a radar beam horizontally to create a horizontal sweep set; and
    providing two vertical sweeps during the horizontal sweep set, the two vertical sweeps being offset from a center horizontal location by at least one beam width, and wherein each of the two vertical sweeps are on opposite sides of the center horizontal location, wherein each vertical sweep includes a downward scan and an upward scan that are separated by less than two beam widths.

9. The method of claim 8, wherein at least one scan of each vertical sweep is at least one beam width offset from the center horizontal location.

10. The method of claim 8, wherein the horizontal sweep set comprises a horizontal sweep in a first direction and a horizontal sweep in a second direction.

11. The method of claim 8, wherein one scan of each vertical sweep is conducted at an offset from the center horizontal location so that its beam width overlaps with a beam width of a vertical scan of another vertical sweep.

12. An apparatus for controlling an aircraft-mounted radar system configured to project radar beams and to receive radar returns relating to the projected radar beams, comprising:
at least one output to the radar system;
processing electronics configured to cause the radar system to sweep a radar beam horizontally and away from a center horizontal location in a horizontal sweep set including two vertical sweeps, wherein the two vertical sweeps are offset from the center horizontal location, wherein the processing electronics are configured to cause the radar beam to continue the horizontal sweep upon completion of the vertical sweeps, wherein the horizontal sweep set includes two primarily horizontal loops, each of the two primarily horizontal loops comprising a horizontal sweep at a first tilt angle and a horizontal sweep at a second tilt angle, the two primarily horizontal loops extending between a left maximum azimuth angle and a right maximum azimuth angle;
wherein one of the two vertical sweeps is conducted during a single primarily horizontal loop; and
wherein the vertical sweeps are conducted between the left maximum azimuth angle and the right maximum azimuth angle.

13. The apparatus of claim 12, wherein the processing electronics are configured to cause the radar system to conduct one of the vertical sweeps so that the one vertical sweep extends below the tilt angle for the horizontal sweep.

14. The apparatus of claim 12, wherein the center horizontal location is at least one of a ground track location and a symmetrical center of a far left of the horizontal sweep and a far right of the horizontal sweep.

15. The apparatus of claim 12, further comprising:
an input configured to receive radar return data relating to the swept radar beam;
wherein the processing electronics are further configured to process the radar return data, and wherein the processing electronics are further configured to provide the radar return data to memory.

16. The apparatus of claim 12, wherein processing the radar return data comprises at least one of:
estimating a presence of terrain using the radar return data,
confirming the presence of terrain,
determining whether to generate a terrain alert, and
forming an image using the radar return data in memory, the image displayed on an electronic display system viewable by a pilot of the aircraft.

17. The apparatus of claim 12, wherein the radar system is a weather radar system and wherein the processing electronics are further configured to distinguish returns relating to weather from returns relating to terrain using returns from the vertical portions of the horizontal sweep set.

18. The apparatus of claim 12, wherein the one of the vertical sweeps is conducted at an azimuth angle to the left of the center horizontal location and one of the vertical sweeps is conducted at an azimuth angle to the right of the center horizontal location.

19. The apparatus of claim 12, wherein the processing electronics are configured to complete the horizontal sweep set including the vertical sweeps within 10 seconds, and wherein the processing electronics are configured to alternate from a vertical sweep to the left of the center horizontal location to a vertical sweep to the right of the center horizontal location after completing the horizontal sweep set.

20. A radar system for mounting to an aircraft and configured to project radar beams and to receive radar returns relating to the projected radar beams, the radar system comprising:
processing electronics configured to cause the radar system to sweep the radar beam horizontally to create a horizontal sweep set and to conduct two vertical sweeps during the horizontal sweep set, the two vertical sweeps offset from a center horizontal location by at least one beam width, and wherein each of the two vertical sweeps are on opposite sides of the center horizontal location, wherein each vertical sweep is conducted by scanning downward from a horizontal sweep of the horizontal sweep set and scanning upward to resume the horizontal sweep set.

21. A method for providing navigation information to a display in an aircraft using an aircraft-mounted radar system that projects radar beams and receives radar returns relating to the projected radar beams, the method comprising:
causing the radar system to sweep radar beams horizontally in horizontal sweeps and providing the returns to memory;
causing the radar system to break from the horizontal sweeps to conduct a vertical scan for terrain that is lateral relative to an aircraft heading, wherein each vertical scan is conducted by scanning downward from a horizontal sweep of the horizontal sweeps and scanning upward to resume the horizontal sweep;
receiving returns from the vertical scan and storing the returns from the vertical scan in the memory;
associating and retaining the returns from the vertical scan;
causing the display to represent terrain features along the aircraft's heading based on the contents of the memory associated with the horizontal sweeps;
recalling the returns from the vertical scan from the memory when the aircraft's heading has changed or is expected to change in a way that will bring the returns from the vertical scan into the display's field of view; and
updating the display using the recalled returns.

22. The method of claim 21, wherein updating the display using the recalled returns comprises rotating the display's field of view such that the returns from the vertical scan are represented on the updated display scene.

23. The method of claim 21, wherein updating the display using the recalled returns further comprises rotating and translating the returns from the vertical scan in memory.

24. The method of claim 21, wherein the returns from the vertical scan are stored and retained in memory according to a geo-spatial storage scheme.

25. The method of claim 21, wherein the returns from the vertical scan are stored and retained in memory relative to aircraft position information.

26. The method of claim 21, wherein the memory is a multi-scan multi-tilt memory.

* * * * *